US007295416B2

(12) United States Patent
Halvarsson et al.

(10) Patent No.: US 7,295,416 B2

(45) Date of Patent: Nov. 13, 2007

(54) DEVICE AND METHOD FOR TRIGGERING A SPARK GAP

(75) Inventors: Per Halvarsson, Västerås (SE); Ola Jeppsson, Västerås (SE); Jan Johansson, Arboga (SE); Lars Paulsson, Vittsjö (SE)

(73) Assignee: ABB AB, Västerås (SE)

( * ) Notice: Subject to any disclaimer, the term of this patent is extended or adjusted under 35 U.S.C. 154(b) by 384 days.

(21) Appl. No.: 10/514,416

(22) PCT Filed: May 8, 2003

(86) PCT No.: PCT/SE03/00739

§ 371 (c)(1),
(2), (4) Date: Nov. 15, 2004

(87) PCT Pub. No.: WO03/096502

PCT Pub. Date: Nov. 20, 2003

(65) Prior Publication Data

US 2005/0168889 A1 Aug. 4, 2005

(30) Foreign Application Priority Data

May 13, 2002 (SE) .................................... 0201424

(51) Int. Cl.
*H02H 1/00* (2006.01)

(52) U.S. Cl. ...................................................... 361/120

(58) Field of Classification Search ................. 361/120
See application file for complete search history.

(56) References Cited

U.S. PATENT DOCUMENTS

| | | | |
|---|---|---|---|
| 4,232,352 | A | 11/1980 | Menju et al. |
| 4,625,254 | A | 11/1986 | Fahlén |
| 4,652,963 | A | 3/1987 | Fahlen |
| 4,703,385 | A | 10/1987 | Stenström |
| 4,860,156 | A | 8/1989 | Stenström et al. |
| 5,325,259 | A | 6/1994 | Paulsson |
| 5,465,030 | A | 11/1995 | Smith |

FOREIGN PATENT DOCUMENTS

| | | | |
|---|---|---|---|
| EP | 0300599 | A1 | 1/1989 |
| EP | 0546692 | A1 | 6/1993 |
| WO | WO9110275 | A1 | 7/1991 |

*Primary Examiner*—Ronald W. Leja
(74) *Attorney, Agent, or Firm*—Venable LLP; Eric J. Franklin

(57) ABSTRACT

A device for quick closing of an electric high-voltage circuit. A main spark gap is provided with a first and a second main electrode, and a triggering device. The triggering device includes an auxiliary electrode gap provided with a first and a second auxiliary electrode and is adapted, where necessary, to generate an arc in the auxiliary spark gap for igniting an arc in the main spark gap. Each auxiliary electrode is provided with a guide rail designed such that the arc, via the guide rails and under the influence of the generated inherent magnetic field, moves into the main spark gap. The two guide rails each have a length that is larger than the width of the auxiliary spark gap. The auxiliary electrodes are adapted so as to be protected from the effect of plasma formed in the main spark gap. A hermetic enclosure encloses the main spark gap and the auxiliary spark gap.

19 Claims, 6 Drawing Sheets

Fig. 8
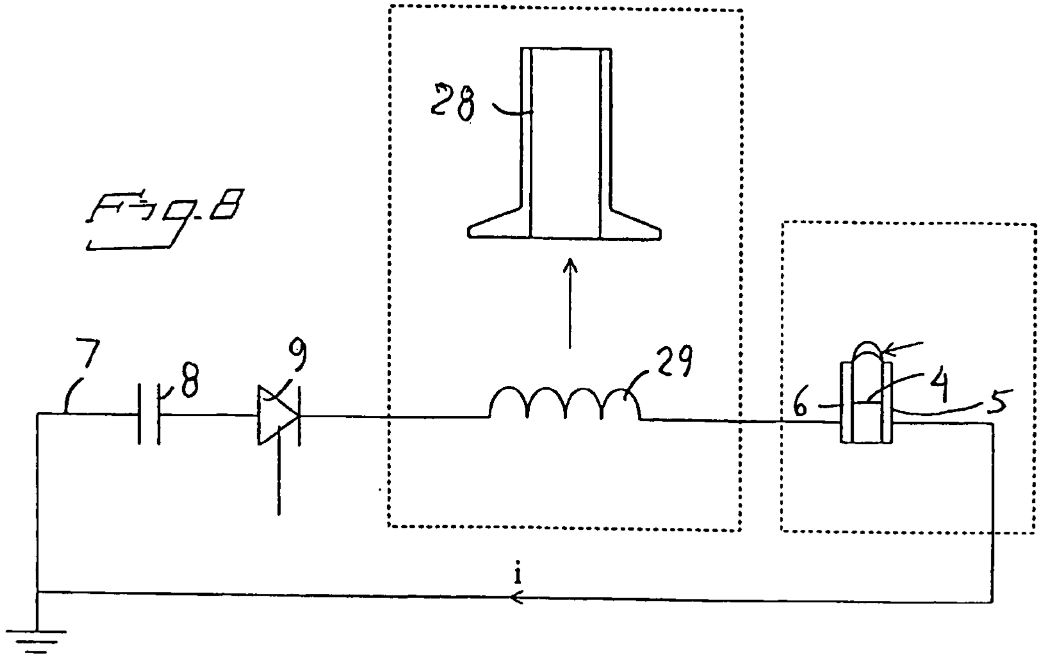
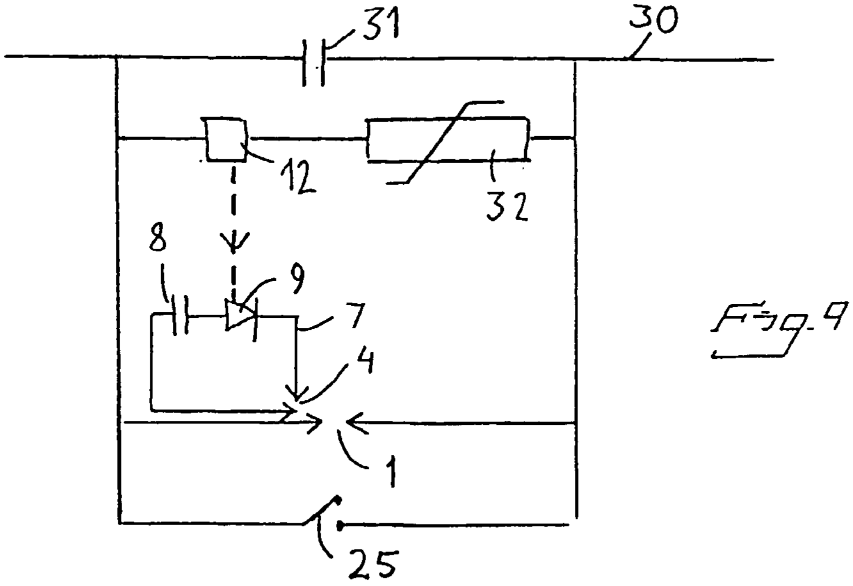
Fig. 9

DEVICE AND METHOD FOR TRIGGERING A SPARK GAP

CROSS-REFERENCE TO RELATED APPLICATIONS

The application claims priority to Swedish patent application 0201424-9 filed 13 May 2002 and is the national phase under 35 U.S.C. § 371 of PCT/SE03/00739 filed 8 May 2003.

FIELD OF THE INVENTION

The present invention relates, from a first aspect, to a device for quick closing of an electric high-voltage circuit. The device comprises a spark gap, provided with a first and a second electrode, and a triggering device. The triggering device comprises an auxiliary spark gap provided with a first and a second auxiliary electrode and is adapted, where necessary, to generate an arc in the auxiliary spark gap to ignite an arc in the main spark gap.

From a second aspect, the invention relates to a method for quickly closing an electric circuit by generating an arc between a first and a second main electrode of a main spark gap with the aid of a triggering device, wherein, where necessary, an arc is generated between a first and a second auxiliary electrode in an auxiliary spark gap associated with the triggering device, whereby an arc in the main spark gap is ignited with the aid of the arc in the auxiliary spark gap.

From a third aspect, the invention relates to uses of the invented device, and from a fourth aspect the invention relates to an overvoltage protection device for a series capacitor.

BACKGROUND ART

Spark gaps adapted to generate an arc between the electrodes, and with a careful time determination, are utilized, inter alia, in high-voltage laboratories for triggering laser beams and as protection for series capacitors in electric power lines. The present invention is primarily intended for applications within the latter field but is not in any way limited thereto.

Series capacitors are used in electric power lines, primarily for increasing the transmission capability of a power line. Such series capacitor equipment comprises a capacitor bank that is connected to the power line and is traversed by the current of the power line. The voltage across such a series capacitor becomes proportional to the current in the power line, and in case of an overcurrent in the power line, for example caused by a short circuit in the power network, an overvoltage arises across the series capacitor. It is previously known, for the purpose of protecting the capacitor from such overvoltages, to connect the capacitor in parallel with a spark gap that is triggered in a suitable manner in case of an overvoltage across the capacitor. In this way, the line current is shunted past the capacitor, which in this way is protected. Known protection devices of this kind are described, for example, in U.S. Pat. No. 4,625,254, U.S. Pat. No. 4,652,963, U.S. Pat. No. 4,703,385, U.S. Pat. No. 4,860,156, U.S. Pat. No. 5,325,259.

U.S. Pat. No. 4,625,254 describes a device comprising a linear resistor that is series-connected to a voltage-dependent metal-oxide varistor (MOV). The series-connected resistor elements are connected in parallel with the series capacitor in a high-voltage network to achieve an overvoltage protective circuit for the series capacitor. Further, a spark gap is connected in parallel with the series-connected resistor elements in the event of overloading thereof. The voltage across the linear resistor triggers a device for igniting the spark gap when the voltage across the linear resistor exceeds a predetermined voltage. The resistance of the linear resistor and of the varistor is so dimensioned that the predetermined voltage constitutes the smaller part of the voltage across the capacitor.

U.S. Pat. No. 4,652,963 describes a series capacitor bank for connection to an electric network, whereby the capacitor bank is provided with equipment for overvoltage protection, which has two branches connected in parallel with the capacitor bank. The first branch comprises a zinc oxide varistor in series with a linear resistor and the second branch comprises a varistor with a higher voltage knee than the first zinc oxide varistor. The resistance of the linear resistor is preferably of the same order of magnitude as the absolute value of the impedance of the capacitor bank at a frequency corresponding to that of the network.

U.S. Pat. No. 4,703,385 describes an overvoltage protection device for a series capacitor in a high-voltage network. A voltage-dependent resistor composed of a number of MOVs are connected in parallel with the capacitor. In parallel with the resistor is a spark-gap member, which consists of two series-connected spark gaps for shunting the resistor in the event of overloading therein. The energy for triggering the spark-gap member is obtained from an extra capacitor that is charged during operation and is supplied to one of the spark gaps via a switching member. The switching member is controlled by an overvoltage detector and a pulse transformer. An MOV is connected in series with the high-voltage winding of the transformer. The transformer is connected such that the trigger pulse is directed opposite to the voltage across the series capacitor.

U.S. Pat. No. 4,860,156 describes an overvoltage protection device for series capacitors with the aid of spark gaps. The protection device comprises a triggering circuit for a spark-gap chain of at least two spark gaps, one of which is provided with at least one triggering electrode. A resistor chain is connected in parallel with the spark-gap chain and comprises at least two series-connected resistor groups. That of the resistor groups that is connected in parallel with that of the spark gaps that has a triggering electrode includes a voltage-dependent resistor composed of zinc-oxide varistors that are connected in series with the linear resistor. The voltage across the linear resistor is supplied to the triggering electrode of the spark gap to ignite the spark gap when this voltage amounts to a predetermined value.

One disadvantage of conventional ignition of the arc in the main spark gap based on an auxiliary spark gap, that is, where the main spark gap is triggered to ignite via a spark generated by a triggering circuit, is that it requires a very high voltage across the main spark gap. The reason for this is that the mode of operation is based on the auxiliary spark gap substantially serving to ionize the air between the main electrodes. The ionization facilitates the formation of an arc between these; however, it assumes that the voltage is sufficient for a flashover to arise. The voltage across the main spark gap must amount to at least some ten kV. This limits the possibilities of application. Further, it requires reconditioning of the spark gap even after a few discharges because the corrosion caused by the arc on the electrodes results in the electrode distance being influenced, which, in the case of such a conventional kind of spark-gap triggering, influences the tripping level, that is, at which voltage across the main spark gap that an arc is formed.

U.S. Pat. No. 5,325,259 describes an overvoltage protection device for a series capacitor that has a main spark gap and an auxiliary spark gap, associated therewith, for ignition of the main spark gap. A second auxiliary spark gap is arranged close to the first auxiliary spark gap for ignition thereof. The auxiliary spark gaps are connected between one of the electrodes of the main spark gap and a voltage divider comprising resistors and a varistor. When exceeding the voltage knee of the varistor, the second auxiliary spark gap is ignited, the arc of which in its turn moves towards and ignites the main spark gap. During the burning time of the spark gap, a controlled discharge of the series capacitor through a resistor takes place.

During the triggering according to U.S. Pat. No. 5,325,259, the arc formation in the main spark gap is not exclusively dependent on ionization in the spark gaps. The first and second spark gaps are so arranged that a certain arc travelling effect is achieved upon ignition of the second auxiliary spark gap by the first auxiliary spark gap and upon ignition of the main spark gap by the second auxiliary spark gap. In this way, the voltage required for maintaining an arc across the main spark gap is lower than in conventional spark gaps. This reduces, to a certain extent, the above-mentioned disadvantages associated with the high voltage required between the main electrodes when using conventional technique. However, there is still a need of a relatively high, although moderate, voltage between the main electrodes.

Therefore, this does not eliminate the disadvantages resulting from the fact that the air has a relatively short sparking distance and hence may be easily re-ignited. Further, there is a risk that the plasma formed in the main spark gap may reach to the auxiliary electrodes and damage these.

The object of the present invention is to eliminate the disadvantages associated with the prior art for igniting an arc in a spark gap.

SUMMARY OF THE INVENTION

The object set up is achieved, according to a first aspect of the invention, in that a device where each auxiliary electrode is provided with a guide rail designed such that the arc, via the guide rails and under the influence of the generated inherent magnetic field, moves into the main electrode gap, each of the two guide rails having a length that is larger than the width of the auxiliary spark gap, that the auxiliary electrodes are arranged such that they are protected from the effect of plasma formed in the main spark gap and that a hermetic enclosure encloses the main spark gap and the auxiliary spark gap.

The generation of the arc in the main spark gap is achieved with the invented device in a way that is fundamentally physically different from what is achieved with conventional technique. With conventional technique, the arc in the main spark gap is achieved by an igniting spark from the auxiliary spark gap ionizing the air between the main electrodes so that a flashover arises therebetween, which presupposes a very high voltage therebetween. With the special design of the auxiliary spark gap according to the invention, the generation of the arc in the main spark gap is not correspondingly dependent on such ionization. The guide rails result in the arc in the auxiliary spark gap, by the inherent magnetic forces that arose around the arc, being brought to successfully move inwards towards the main spark gap so that gradually the arc is established between the electrodes of the main spark gap.

A very serious consequence of this difference is that no bias voltage is needed across the main spark gap in addition to the arc voltage drop and the electrode voltage drop. It may therefore be sufficient here with a voltage of the order of magnitude of 1 kV or even lower.

The fact that no high voltage is required across the main spark gap entails considerable advantages. The function of the spark gap will be relatively insensitive to the variation of its width. In this way, the spark gap need not be reconditioned after a discharge. The spark gap may thus be activated hundreds of times without any requirement for intermediate service. Further, the spark gap may be used for new functions where no high voltage arises when the spark gap is to be activated. Further, the spark gap is insensitive to the external environment, such as moisture, ice, snow, dirt and insects. Since the auxiliary electrodes are protected from the effect of plasma formed in the main spark gap, the risk that the arc in the main spark gap may damage the auxiliary electrodes is avoided.

The hermetic enclosure entails further advantages. It eliminates the effect of the external environment to an even greater extent. The air or gas density is maintained, which provides a possibility of quick reclosing of the installation that the spark gap is intended to protect. In addition, the gap may be designed compact, that is, with a small gap width.

Because of the hermetic enclosure, the pressure therein may be adjusted. This means that the device according to the invention may be designed with a uniform distance between the main electrodes for various applications by adapting the gas pressure for the respective application.

According to a preferred embodiment of the invented device, the guide rails are substantially parallel and directed towards the first main electrode and have a length that is several times larger than the width of the auxiliary spark gap. The parallelism and the direction stated entail favourable conditions for initiating travelling of the auxiliary arc and causing the arc to be established between the main electrodes. In this connection, it is also advantageous for the guide rails to have a relatively large length.

According to another preferred embodiment of the invention, the auxiliary electrodes are protected from the influence of the plasma in the main spark gap by being arranged in a protected position relative to the spark gap. With this design, the protection of the auxiliary electrodes is achieved in a very simple way by utilizing the fact that the field of action of the plasma is limited with respect to distance and direction. In many applications, this may be sufficient to achieve protection of the auxiliary electrodes.

According to still another preferred embodiment, this position is such that the auxiliary spark gap is arranged adjacent to the second main electrode and located somewhat displaced from the main spark gap as viewed in the direction of the main spark gap. Such a position combines in an optimal way the two contradictory requirements that the guide rails should be located as close to the main spark gap as possible and that the auxiliary electrodes should be protected from the effect of the plasma. In the position stated, a "lee" position from the plasma and the forces influencing its propagation is achieved.

In this application, the direction for a spark gap means the direction for a line that constitutes the shortest distance between the electrodes of the spark gap.

According to a further preferred embodiment, a shielding device is arranged between the guide rails and the main spark gap. This is an alternative or complementary way of protecting the auxiliary electrodes from the plasma. By the shielding device, the guide rails may be arranged nearer to the main spark gap than otherwise. This is very favourable when it comes to the ability of the auxiliary arc to move over to the main spark gap.

According to yet another preferred embodiment, when the shielding device is used it is provided with an opening. In this way, this opening allows the arc to move towards the main spark gap in such a way that the shielding device constitutes as small an obstacle as possible.

According to a further embodiment, the main spark gap is designed for a movable arcing path via the inherent magnetic field. In this way, the arc is prevented from connecting point by point with the respective electrode, whereby the exposure of the electrodes to the harmful influence of the arc is distributed and becomes less harmful.

According to still another preferred embodiment, each main electrode is annular. This is a practical and appropriate way of realizing a movable arcing path, thus creating natural, favourable conditions for the mobility of the arc.

According to a further preferred embodiment, one of the guide rails of the triggering device is arranged at the same potential as said second main electrode of the main spark gap. This makes it possible, without requirements for insulation, to arrange said guide rail close to the second main electrode. This further facilitates bringing the arc from the auxiliary electrode gap to move and generate the arc in the main electrode gap.

According to still another preferred embodiment, the device comprises a mechanical contact device connected in parallel with the main spark gap. This allows the current to be rapidly shunted over to the line with the mechanical contact device so as to extinguish the arc. Using conventional technique, this can be performed with a circuit breaker that has a quick closing time, for example 20 ms. This makes the arc duration in the main spark gap short, which provides a possibility of very quick reclosing of the main spark gap.

According to yet another preferred embodiment, the mechanical contact device is enclosed in a hermetic enclosure. In this way, also this device is protected from the external environment and a compact design is achieved.

The mechanical contact device may suitably be of a special design adapted to further shorten the arc duration in the main spark gap by a very quick closing operation, for example 5 ms. This provides a low energy development in the main spark gap and enables very quick reclosing of the main spark gap.

According to a further preferred embodiment, each enclosure encloses a gaseous medium of overpressure.

The pressurization provides a high dielectric strength as well as a good heat capacity and a rapid recovery of the voltage insulation. This enables the gap width for the main spark gap to be kept smaller so that the introduction of the arc from the auxiliary spark gap proceeds faster and hence provides a faster ignition of a continuous arc in the main spark gap.

According to a still another preferred embodiment, an electric drive circuit is adapted to generate the arc in the auxiliary spark gap. In this drive circuit, a coil for operating the mechanical contact device is connected in series. By series-connecting the triggering of the arc in the auxiliary spark gap and operating the mechanical contact device, a perfect synchronization thereof is achieved.

According to yet another preferred embodiment, the device is designed as a high-voltage protection device for an electric system and the triggering device is adapted to be supplied with energy direct from the fault current of the line. This eliminates the need of a separate energy magazine. Because the triggering is thus driven directly by the fault current of the line, the arc-through of the main spark gap will be faster the higher the amplitude of the fault current is.

According to an alternative preferred embodiment to the immediately preceding embodiment, the device comprises an energy magazine adapted to be supplied with energy from the line during the normal operation thereof. Such a solution may be appropriate in certain applications and means that a well-defined volume of energy is available that is adapted to the energy needed for triggering the auxiliary spark gap and, where applicable, to the coil for closing the mechanical contact device.

According to another preferred embodiment, the triggering device is adapted to be supplied with energy from an energy source that is independent of the line. This creates increased flexibility as regards possible applications.

From a second aspect, the object set up is achieved with a method where the arc in the auxiliary spark gap, via guide rails under the influence of inherent magnetic forces, is brought to move into the main spark gap, in that the auxiliary electrodes are protected from the effect of plasma formed in the main spark gap, and in that the main spark gap and the auxiliary spark gap are enclosed in a hermetic enclosure.

According to preferred embodiments of the invented method, the method is carried out while utilizing the invented device.

The invented method and the preferred embodiments thereof entail advantages of a kind similar to those gained by the invented device and the preferred embodiments thereof, which advantages have been described above.

The invented uses constitute applications of the invented device, where the utilization of its advantages is of great value.

The invented overvoltage protection device for a series capacitor exhibits the feature that it is provided with a device according to embodiments of the present invention. Since the invented device is of special interest as a component in such an overvoltage protection device, the invented overvoltage protection device implies that the advantages of the invented device are utilized in a field where these advantages are made use of to a great extent.

The invention will be described in greater detail in the following detailed description of advantageous embodiments thereof with reference to the accompanying figures of drawings.

BRIEF DESCRIPTION OF THE DRAWINGS

FIG. 8 is a circuit diagram for the triggering circuit according to one embodiment of the invention.

FIG. 9 is a circuit diagram for an overvoltage protection device utilizing a spark gap according to the invention.

DESCRIPTION OF ADVANTAGEOUS EMBODIMENTS

Figure 1:
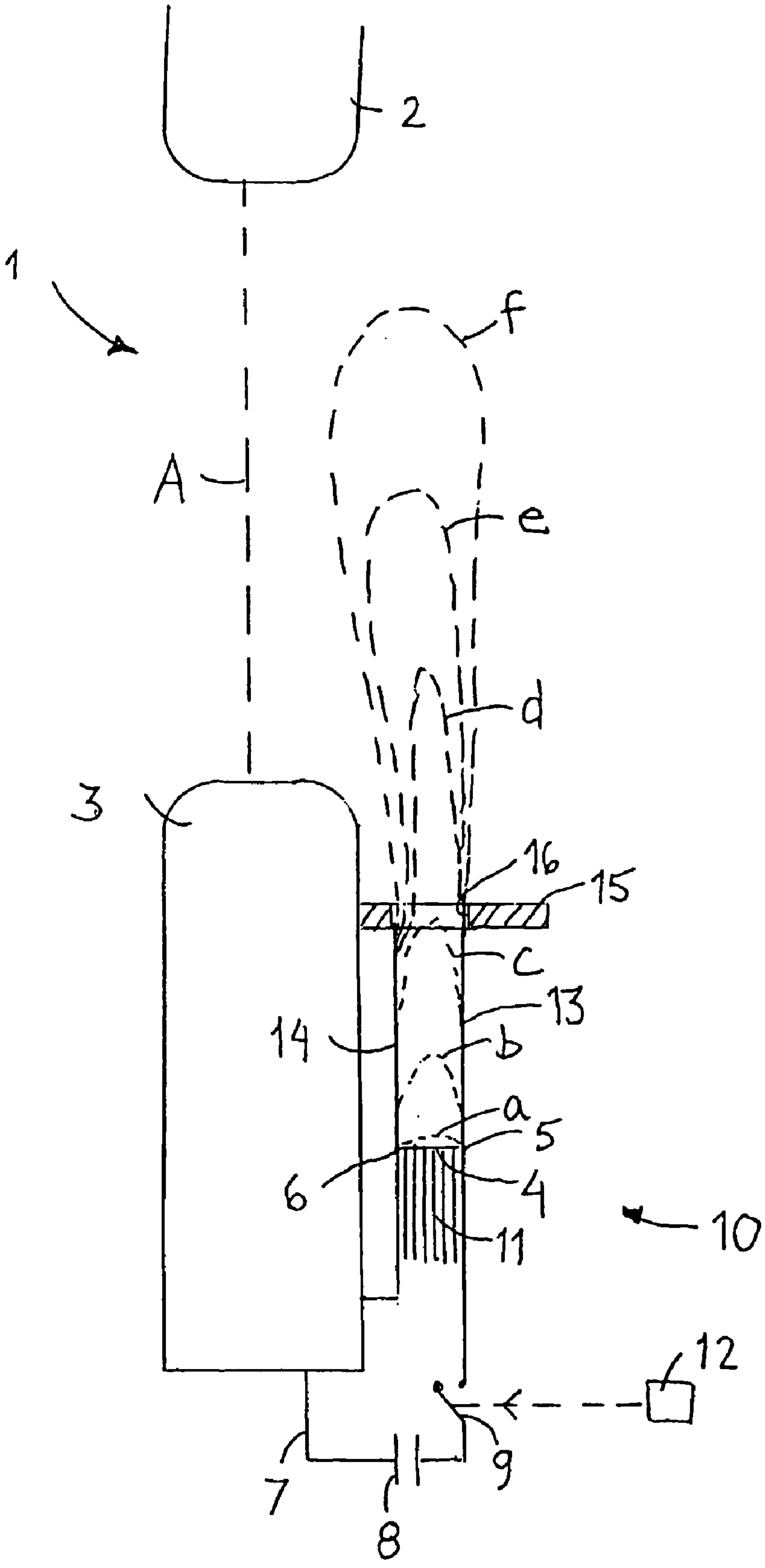
FIG. 1 is an illustration of the principle of the invention.

FIG. 1 is a schematic illustration of the device according to the invention intended to explain the principle of how the triggering device achieves an arc in the main spark gap.

A first 2 and a second 3 main electrode form between them a main spark gap 1. Associated with the second main electrode 3 is a triggering device 10. The triggering device comprises a first 5 and a second 6 auxiliary electrode forming between them an auxiliary spark gap 4. Between the auxiliary electrodes 5 and 6, a package 11 of intermediate electrodes is arranged. The auxiliary electrodes 5, 6 constitute part of a circuit 7 where the first auxiliary electrode 5 is connected, via a normally open make contact 9, to one side of the capacitor bank 8 and the second auxiliary electrode 6 is connected to the other side of the capacitor bank 8.

When there is a need to generate an arc in the main spark gap 1, the make contact 9 is operated to close the circuit 7. The operation is initiated by a control unit 12 influenced by parameters defining said need. When the circuit 7 is closed, the capacitor bank 8 is discharged between the auxiliary electrodes 5, 6, thus creating an arc in the spark gap 4 between these electrodes.

Each auxiliary electrode 5, 6 is connected to a guide rail 13, 14. The guide rails 13, 14 may, in practice, consist of an extension upwards of the respective auxiliary electrode 5, 6. When an arc a is formed in the auxiliary spark gap 4, the inherent magnetic forces thus arising will cause the arc to move outwards between the two guide rails 13, 14. This causes the arc to successively assume an increasingly more bulging shape b, c, d, which to an increasing degree forms arcs e, f in an upwards direction towards the first main electrode 2. Gradually, the arc will move over to and bridge the main spark gap 1 and form an arc A between the main electrodes 2, 3. The process described is, of course, an idealization of the actual process. In reality, the auxiliary arc does not strictly follow the drawn curves, especially not in their later stages e, f. In reality, a plasma is formed, the propagation of which is rather undetermined and difficult to define but which substantially extends as indicated by the arcs in the figure.

The auxiliary electrodes 5, 6 and their extension in the guide rails 13, 14 are protected from the effect of the plasma formed in the main electrode gap 1. One reason for this is that they are located somewhat concealed from the main spark gap 1 by the second main electrode 3, and another reason is that a shielding device 15 is arranged between the guide rails 13, 14 and the main spark gap 1. The shielding device 15 consists of a plate of Teflon that is provided with an opening 16 to allow the auxiliary arc a-f to move up towards the main spark gap 1.

Figure 2:
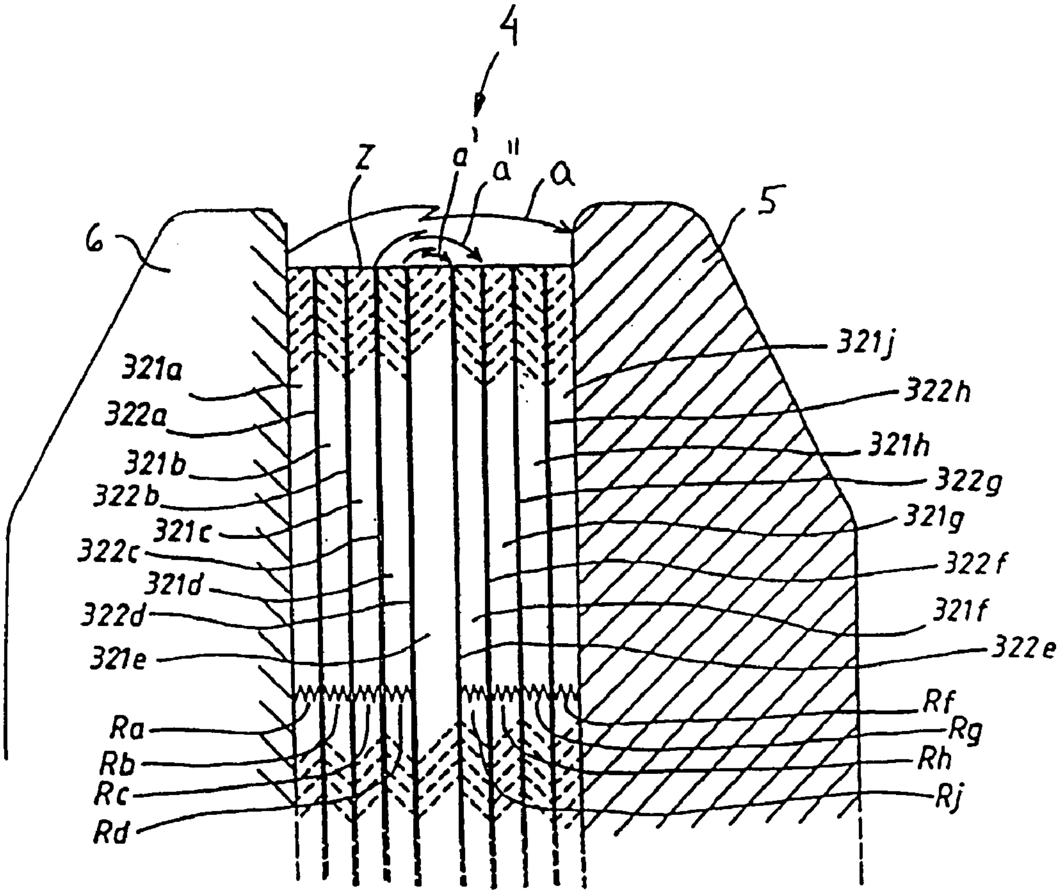
FIG. 2 is a section through a detail of FIG. 1.

The auxiliary spark gap 4 is suitably of a low-voltage surface flashover type. Such a spark gap is illustrated in FIG. 2. Between its auxiliary electrodes 5 and 6, a number, in this case eight, of intermediate electrodes in the form of metal foils or thin metal sheets are arranged and designated 322*a*-322*h*. The intermediate electrodes are separated by electrically insulating layers 321*a*-321*j*. The intermediate electrodes are divided into two groups. The electrodes 322*a*-322*d* are connected to one another and to the auxiliary electrode 5 by means of resistors Ra, Rb, Rc and Rd. In a corresponding manner, the intermediate electrodes 322*e*-322*h* are connected to one another and to the auxiliary electrode 5 by means of the resistors Rf-Rj. The intermediate electrodes and the insulated shims form a plane surface Z at their upper end in the figure, along which surface, upon activation of the spark gap, flashover may occur between the various electrodes. At is lower end in the figure, the electrode package is shaped such that its electric strength is greater there than at the surface Z to ensure that flashover occurs at the latter surface.

The rapidly rising voltage upon triggering is applied between the intermediate electrodes 322*d* and 322*e* in the auxiliary spark gap 4. When the voltage reaches a certain level, a flashover a occurs between them. The current in the arc gives rise to a voltage drop in the resistors Rd and Rj and hence to a propagation of the arc $a^{11}$ to the intermediate electrodes 322*c* and 322*f*. In this way, the arc spreads very rapidly along the surface Z from one intermediate electrode to another until the discharge takes place directly between the electrodes 5 and 6.

When the arc a has been thus established between the auxiliary electrodes 5, 6, the process described with reference to FIG. 1 starts in that the arc a moves upwards in FIG. 2 along the guide rails 13, 14 (not shown in FIG. 2).

Figure 3:
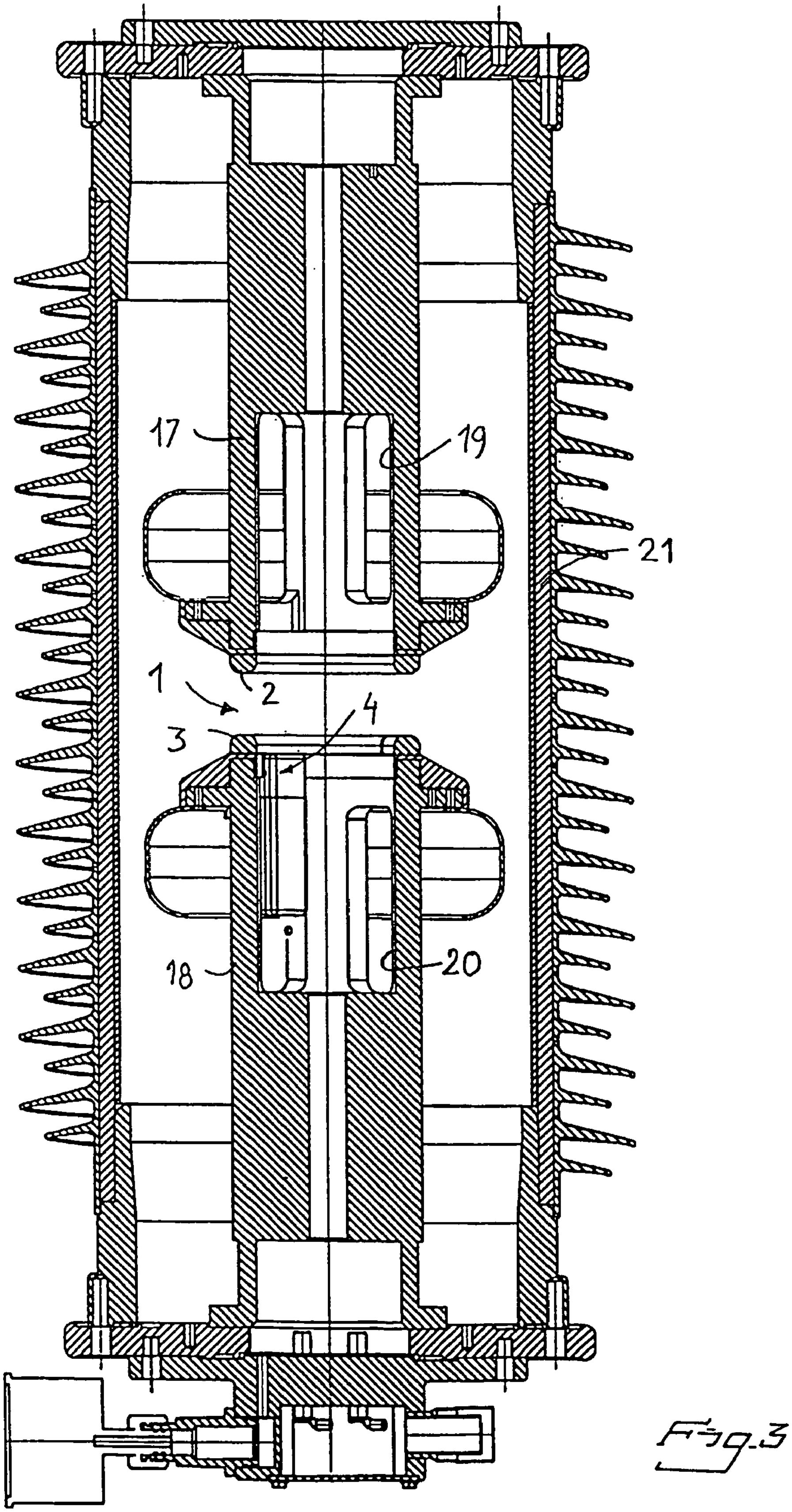
FIG. 3 is a section through a first advantageous embodiment according to the invention.

Whereas FIG. 1 illustrates the spark gap according to the invention from a more fundamental point of view, FIG. 3 shows an example of how it may be designed in practice.

Each main electrode 2, 3 is designed as a circular ring of copper, and the main spark gap 1, which in the order of size of 50 mm, is formed between the two rings. Each copper ring is galvanically connected to a respective electrode support 17, 18 of aluminium. Each electrode support has a recess 19, 20 with a diameter corresponding to the inner diameter of the respective ring. In the recess 20 in the electrode support 18 of the second main electrode 3, the auxiliary spark gap 4 and its guide rails are arranged close to the peripheral wall of the recess. The whole device is enclosed in a hermetic enclosure. Inside the enclosure, there is an overpressure and the medium is air. The overpressure is of the order of magnitude of 1-10 bars, for example 6 bars. Alternatively, it may be nitrogen or an electronegative gas, such as $SF_6$. The non-conducting part of the enclosure, that is, the main part of the envelope surface, consists of an epoxy tube that is lined with Teflon on the inside.

Figure 4:
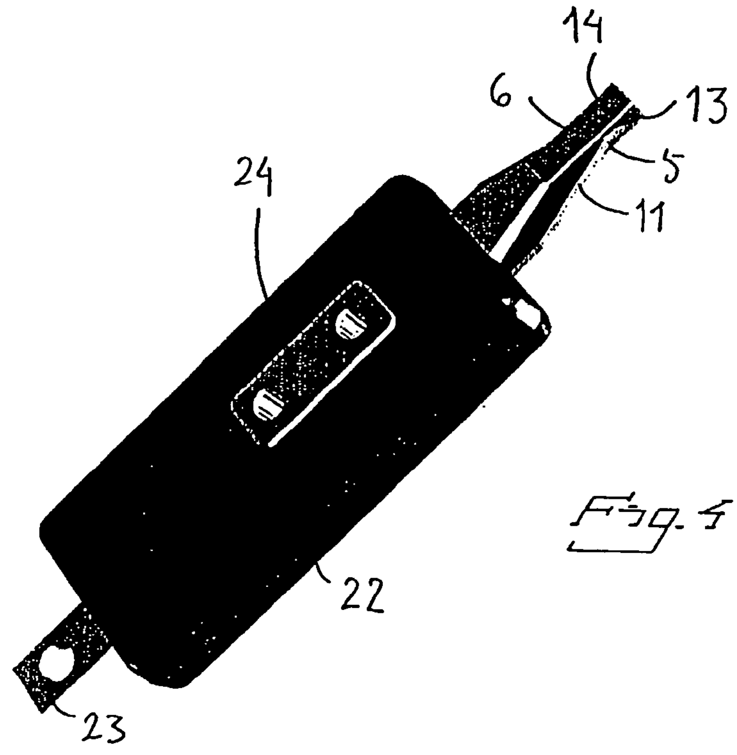
FIG. 4 is a perspective view of a detail of FIG. 4.

FIG. 4 illustrates, by means of a perspective view, an example of how the auxiliary electrodes may be designed. Each auxiliary electrode 5, 6 is arranged on a respective metal strip, suitably a copper-tungsten alloy, which is cast into a mounting plate 22 of insulating material. The strip that forms the first auxiliary electrode 5 extends out through the opposite end of the plate. The end 23 of the strip protruding there is connected to one side of a capacitor bank 8 (see FIG. 1). The strip that forms the second auxiliary electrode 6 is connected to a metal piece 24 that is arranged on one side of the mounting plate and connected to the electrode support 18 of the second main electrode 3 (see FIGS. 1 and 3) and via this support to the other side of the capacitor bank. Between the two auxiliary electrodes, the package 11 of intermediate electrodes is arranged and designed as a laminated plate. The guide rails 13, 14 are formed from the extension of the respective metal strip past the location where the auxiliary spark gap is located, that is, where the package 11 with intermediate electrodes ends. The guide rails 13, 14 has a length outside the auxiliary spark gap that is of the order of size of 20 mm. The width of the auxiliary spark gap 4, as well as the distance between the guide rails, is of the order of size of 2 mm.

Figure 5:
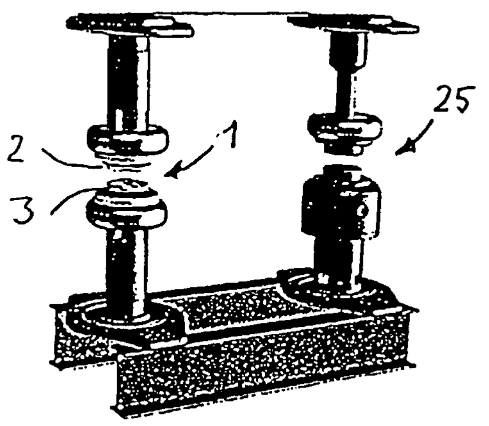
FIG. 5 is a perspective view of a second advantageous embodiment according to the invention.

FIG. 5 illustrates an embodiment where the spark gap 1 is connected in parallel with a mechanical contact device 25 for forming an overvoltage protection device that is intended, for example, to carry a high current for a relatively long period of time. At an overvoltage, the spark gap is first triggered, as described above, and shortly thereafter the contact device 25 is closed, the arc thus being extinguished.

Figure 6:
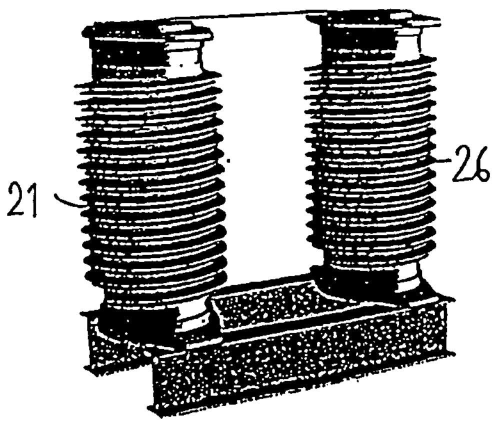
FIG. 6 is a perspective view of the embodiment of FIG. 5 and provided with the enclosure.

FIG. 6 illustrates the embodiment according to FIG. 5, where both units are provided with a respective enclosure 21, 26.

Figure 7:
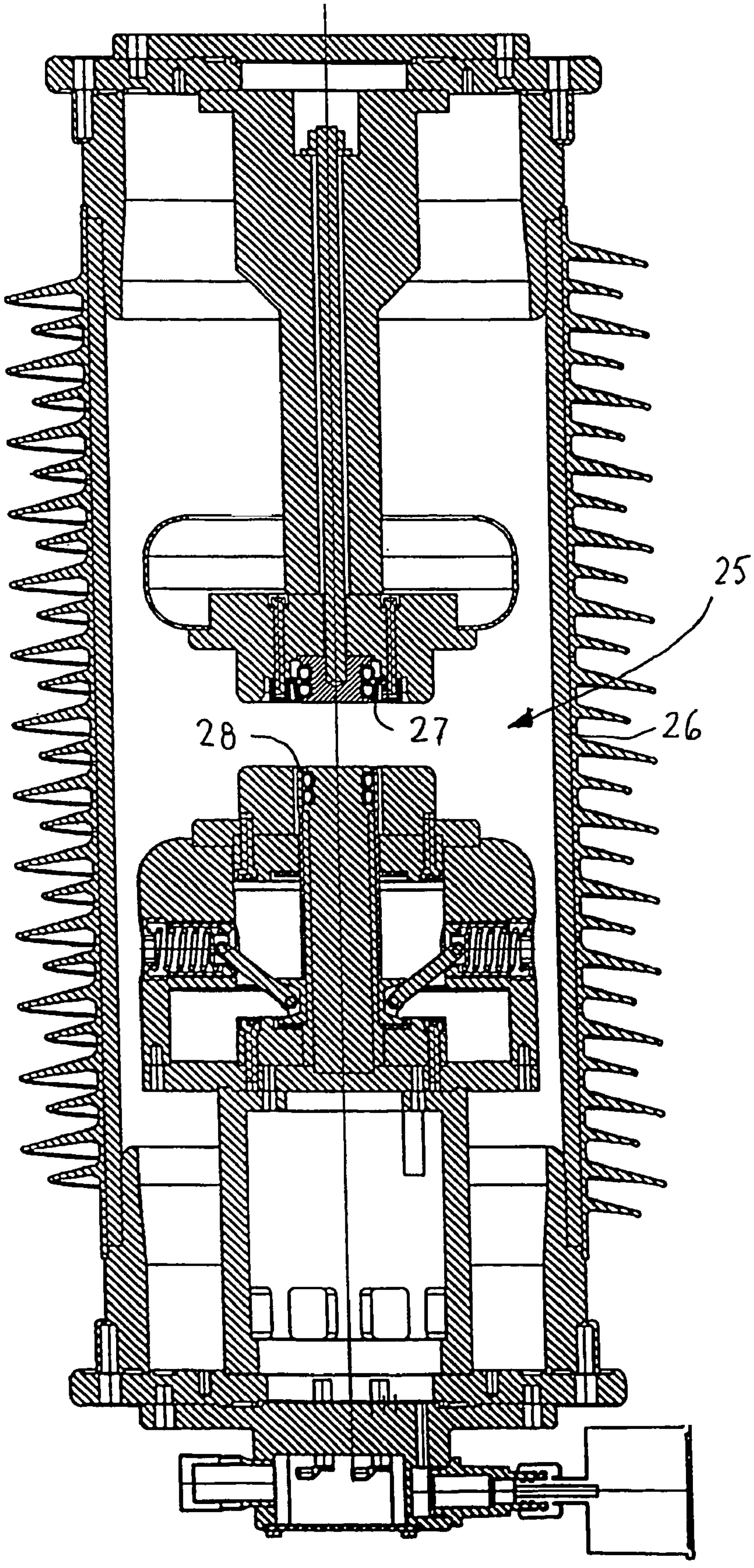
FIG. 7 is a section through a detail of FIG. 6.

FIG. 7 illustrates in more detail an embodiment of the contact device 25 illustrated in FIG. 5. The contact device is designed as a quick circuit closer and does not, per se, constitute any newly invented component. The circuit closer has a fixed contact member 27 and a movable contact member 28. The movable contact member is designed as a tube adapted, upon activation, to be displaced upwards and penetrate into an annular slot in the fixed contact member 27. Activation takes place with the aid of a primary coil (not shown). A circuit closer of the kind illustrated in FIG. 7 is described in greater detail in WO 00/67271, which is hereby referred to.

FIG. 8 is a diagram illustrating the triggering of the embodiment shown in FIGS. 5-7. In a drive circuit 7 comprising a capacitor bank 8 and a closer unit 9 designed as a thyristor, there are arranged in series the spark gap 4 and a primary coil 29. Upon activation of the thyristor 9, the circuit is closed whereupon an arc is established in the auxiliary electrode gap 4 between the auxiliary electrodes 4-6. After approximately 0.5 ms, the arc has ignited an arc in the main electrode gap in a way described in more detail with reference to FIG. 1.

The primary coil 29 is adapted to displace the movable contact member 28 of the contact device 25 (see FIG. 7) in a direction towards the fixed member to close the current through the contact device. This takes place after about 4 ms whereby the arc in the main spark gap is extinguished.

With a main spark gap with the gap width 50 mm and the voltage 3 kV across the gap and an overpressure in air of 6 bars, the trigger time is about 0.6 ms. The gas is self-ignited at about 250 kV AC rms. The trigger time is reduced with increasing voltage across the gap.

FIG. 9 shows a diagram where the device is applied as overvoltage protection device for a series capacitor. In a power line 30 with a series capacitor 31, there is arranged an overvoltage protection device comprising a varistor 32, a main spark gap 1 and a mechanical contact device 25, these three components being connected in parallel. A current-measuring device 12 is arranged in series with the varistor.

At an overcurrent in the power line 30, for example as a result of a short-circuit in the network, an overvoltage arises across the capacitor 31. The current through the varistor 32 is measured with the current-measuring device. The measurement is integrated for a period of a few ms to some 20 or 30 ms, and the volume of energy measured constitutes a criterion as to whether the overvoltage protection device is to be activated or not. The threshold value, at which activation occurs, may be of the order of magnitude of some 20 or 30 MJ. The current-measuring device 12 thus constitutes the control unit 12 arranged in FIG. 1 and defines when there is a need to generate an arc.

When this is the case, the current-measuring device/control device 12 sends a signal to a closer 9 in the circuit 7 in which the auxiliary spark gap 4 is included. The closer 9 may be a thyristor. This leads to the generation of an arc in the auxiliary spark gap 4, and this arc ignites an arc in the main spark gap 1, which is described in greater detail with reference to FIG. 1 above. At the same time, the contact device 25 is activated to close, as described above with reference to FIG. 8.

The control function may be carried out with other control parameters than what has been described above. For example, the current in line 30 may be included as an additional parameter.

The object of creating an arc in the main spark gap may be other than providing overvoltage protection.

The invention claimed is:

1. A device for quick closing of an electric high-voltage circuit, the device comprising:

a first main electrode and a second main electrode with a main spark gap therebetween;

a triggering device comprising a first auxiliary electrode and a second auxiliary electrode with an auxiliary electrode gap therebetween, the triggering device being configured to generate an arc in the auxiliary spark gap for igniting an arc in the main spark gap, each auxiliary electrode comprising a guide rail each having a length that is larger than a width of the auxiliary spark gap, the guide rails being configured to move under the influence of a generated inherent magnetic field an arc into the main spark gap, and wherein the first auxiliary electrode and the second auxiliary electrode are adapted to be protected from an effect of plasma formed in the main spark gap;

a first hermetic enclosure enclosing the main spark gap and the auxiliary spark gap; and a shielding device arranged between the guide rails and the main spark gap.

2. The device according to claim 1, wherein the guide rails are substantially parallel and directed towards said first main electrode and have a length that is several times larger than the width of the auxiliary spark gap.

3. The device according to claim 1, wherein the first auxiliary electrode and the second auxiliary electrode are protected from the effect of the plasma in the main spark gap by being arranged in a protected position relative to the main spark gap.

4. The device according to claim 3, wherein the auxiliary spark gap is arranged adjacent to said second main electrode and located some distance away from the main spark gap as viewed in the direction of the main spark gap.

5. The device according to claim 1, wherein the shielding device comprises an opening.

6. The device according to claim 1, wherein the main spark gap is designed for a movable arcing path via the inherent magnetic field.

7. The device according to claim 6, wherein each of the first main electrode and the second main electrode is annular.

8. The device according to claim 1, wherein one of the guide rails of the triggering device is at a same potential as said second main electrode of the main spark gap.

9. The device according to claim 1, further comprising:

a mechanical contact device connected in parallel with the main spark gap.

10. The device according to claim 9, further comprising:

a second hermetic enclosure enclosing the mechanical contact device.

11. The device according to claim 10, wherein each of the first hermitic enclosure and the second hermetic enclosure encloses a gaseous medium under overpressure.

12. The device according to claim 1, further comprising:

an electric drive circuit adapted to generate the arc in the auxiliary spark gap, the drive circuit comprising a primary coil for operating the mechanical contact device connected in series.

13. The device according to claim 1, wherein the device is designed as a high-voltage protective device for an electric system, and wherein the triggering device is adapted to be supplied with energy direct from the fault current of a line.

14. The device according to claim 1, wherein the triggering device is adapted to be supplied with energy from an energy magazine, which in turn is supplied with energy from a line during normal operation thereof.

15. The device according to claim 1, wherein the triggering device is adapted to be supplied with energy from a source of energy that is independent of a line.

16. Use of a device according to claim 1 for quickly closing an electric high-voltage circuit.

generating with a triggering device an arc between a first main electrode and a second main electrode of a main spark gap;

generating where necessary an arc between a first auxiliary electrode and a second auxiliary electrode in an auxiliary spark gap associated with the triggering device, whereby an arc in the main spark gap may be ignited with the aid of the arc in the auxiliary spark gap; and bringing the arc in the auxiliary spark gap to move into the main spark gap via guide rails and under the influence of inherent magnetic fields, wherein the auxiliary electrodes are protected from the effect of plasma formed in the main spark gap, the main spark gap and the auxiliary spark gap are enclosed in a hermetic enclosure, and a shielding device is arranged between the guide rails and the main spark gap.

17. The use according to claim 16 as overvoltage protection device for a series capacitor.

18. An overvoltage protection device for a series capacitor, wherein the overvoltage protection device comprises a device according to claim 1.

19. A method for quickly closing an electric high-voltage circuit, the method comprising:

generating with a triggering device an arc between a first main electrode and a second main electrode of a main spark gap;

generating where necessary an arc between a first auxillary electrode and a second auxillary electrode in an auxillary spark gap associated with the triggering device, whereby an arc in the main spark gap may be ignited with the aid of the arc in the auxillary spark gap; and bringing the arc in the auxillary spark gap to move into the main spark gap via guide rails and under the influence of inherent magnetic fields, wherein the auxillary electrodes are protected from the effect of plasma formed in the main spark gap, the main spark gap and the auxillary spark gap are enclosed in a hermetic enclosure, and a shielding device is arranged between the guide rails and the main spark gap.

* * * * *